United States Patent
Colombo et al.

(10) Patent No.: US 7,217,377 B2
(45) Date of Patent: May 15, 2007

(54) PHOTOCHROMIC OPTICAL WAVEGUIDES AND METHOD FOR THE PREPARATION THEREOF

(75) Inventors: Marco Colombo, Milan (IT); Antonio Zaopo, Milan (IT); Yuri A. Dubitsky, Milan (IT); Giuseppe Zerbi, S. Felice Segrate (Milan) (IT); Chiara Bertarelli, Varese (IT); Maria Carla Gallazzi, Pavia (IT)

(73) Assignee: Pirelli & C. S.p.A., Milan (IT)

( * ) Notice: Subject to any disclaimer, the term of this patent is extended or adjusted under 35 U.S.C. 154(b) by 0 days.

(21) Appl. No.: 10/538,874

(22) PCT Filed: Dec. 23, 2002

(86) PCT No.: PCT/EP02/14880

§ 371 (c)(1),
(2), (4) Date: Feb. 16, 2006

(87) PCT Pub. No.: WO2004/057377

PCT Pub. Date: Jul. 8, 2004

(65) Prior Publication Data

US 2006/0165368 A1    Jul. 27, 2006

(51) Int. Cl.
G02B 6/00    (2006.01)

(52) U.S. Cl. ............... 264/1.24; 526/242; 526/319; 526/329.7; 526/346; 526/347

(58) Field of Classification Search ......... 526/242, 526/319, 329.7, 227; 549/462, 57, 59; 548/455, 548/517
See application file for complete search history.

(56) References Cited

U.S. PATENT DOCUMENTS

| | | | |
|---|---|---|---|
| 5,294,522 A * | 3/1994 | Uchida et al. | 430/345 |
| 6,359,150 B1 * | 3/2002 | Fukudome et al. | 549/59 |
| 6,479,604 B1 * | 11/2002 | Kim et al. | 526/242 |

FOREIGN PATENT DOCUMENTS

| | | |
|---|---|---|
| EP | 0 698 605 B1 | 2/1996 |
| FR | 2 774 998 | 8/1999 |
| JP | 11-202144 | 7/1999 |
| JP | 2000-221351 | 8/2000 |
| WO | WO 02/06361 A2 | 1/2002 |

OTHER PUBLICATIONS

Irie, M., "Photochromic Compound," Patent Abstracts of Japan, JP. No. 07-082266, (Mar. 3, 1995).
Sukegawa, T., "Polymeric Photochromatic Composition," Patent Abstracts of Japan, JP. No. 06-240242, (Aug. 30, 1994).
Yoshida, T. et al., "Refractive Index Changes in Photochromic Diarylethene Dethene Derivatives in Polymethylmethacrylate Films," Journal of Photochemistry and Photobiology A: Chemistry, vol. 95, pp. 265-270, (1996).

* cited by examiner

*Primary Examiner*—Frank G. Font
*Assistant Examiner*—Guy G. Anderson
(74) *Attorney, Agent, or Firm*—Finnegan, Henderson, Farabow, Garrett & Dunner, L.L.P.

(57) ABSTRACT

An optical waveguide based on a photochromic diarylethene polymer dispersed in a polymeric matrix, and a method for preparing such waveguide is disclosed.

18 Claims, No Drawings

PHOTOCHROMIC OPTICAL WAVEGUIDES AND METHOD FOR THE PREPARATION THEREOF

CROSS REFERENCE TO RELATED APPLICATION

This application is a national phase application based on PCT/EP2002/014880, filed Dec. 23, 2002, the content of which is incorporated herein by reference.

BACKGROUND OF THE INVENTION

1. Field of the Invention

The present invention relates to optical waveguides based on a photochromic diarylethene polymer, and to a method for the preparation thereof.

2. Description of the Related Art

As reported for instance by Yoshida et al., Journal of Photochemistry and Photobiology A: Chemistry 95 (1996) 265–270, materials the refractive index of which can be changed have been studied for optical applications. The refractive index change Δn in organic photochromic compounds have led to proposals for their use in a number of optical wave-guide components since a refractive index change in an optical wave-guide can shift the phase of the signal light. In addition, the reversible refractive index change of photochromic compounds allows the light phase shift to be controlled. However, almost all conventional organic photochromic compounds have low thermal stability, and the refractive index change caused by light irradiation is unstable at room temperature. Thermally irreversible photochromic compounds such as 1,2-diarylethene derivatives have been developed and good durability has been reported in photochromic reaction cycles. Once closed such 1,2-diarylethene derivatives are thermally stable but exhibit reversible photochromism with high conversion efficiency.

The above cited paper shows the performance of a number of compounds, for example

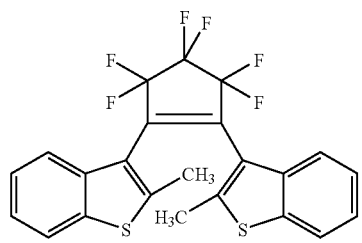

dispersed in PMMA (polymethylmethacrylate) at concentrations varying from 5 to 50 wt % against PMMA. A Δn of more than $10^{-3}$ was obtained with large compound concentration (higher than 30 wt %) only.

FR 2774998 (in the name of Ecole Polytechnique) relates to 1,2-dithienylethene compounds and polymers of general formula

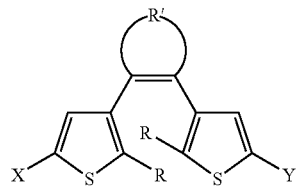

wherein X and Y can be a reactive function such as COCl; R can typically be $CH_3$, and R' can be a cyclic group, typically $—CF_2CF_2CF_2—$.

The photochromic materials can be constituted either by a solid matrix and photochromic molecules chemically bound to said matrix. Such chemical bond is said to obviate problems of phase separation occurring when the photochromic molecule is merely dispersed into the polymer matrix.

JP 11202144 (in the name of Hitachi Ltd.) discloses X-type wave-guides obtained by using at least two kind of photoactive diarylethene molecules (reactive at different wavelengths) dispersed in a polymeric matrix such as fluorinated PMMA. Irradiation is conducted through an exposure mask. Connection with optic fibers is also shown.

JP2000221351 (in the name of Kyocera Corp.) relates to an X coupler obtained by fluorinated PMMA containing photochromic diarylethene derivatives.

SUMMARY OF THE INVENTION

Applicant perceived that low concentrations of a 1,2-diarylethene polymer dispersed in a matrix provides a photochromic optical wave-guide with a significant refractive index change.

Therefore, the present invention relates to an optical waveguide comprising a matrix and an optical path including a photochromic diarylethene polymer having the general formula (Ia)

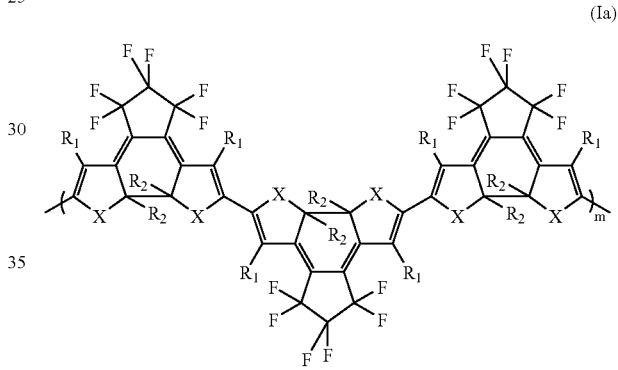

(Ia)

wherein
X is S, O, Se, Te, or N—R, wherein R is hydrogen or a linear or branched ($C_{1-12}$)alkyl group;
$R_1$ is hydrogen, a linear or branched ($C_{1-12}$)alkyl or ($C_{1-12}$)alkoxy group;
$R^2$ is a linear or branched ($C_{1-12}$)alkyl group; and
m=4–100.

Preferably, X is S, Se or Te, more preferably it is S.
Preferably, $R^1$ is hydrogen or a ($C_{1-3}$)alkyl group.
Preferably, the optical path of the waveguide of the invention is surrounded by a matrix comprising a photochromic diarylethene polymer having the general formula (Ib)

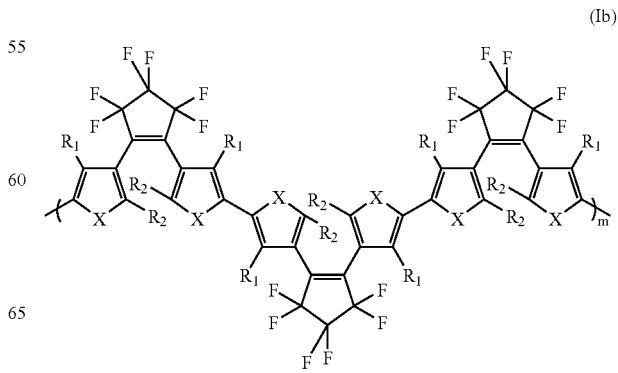

(Ib)

wherein X, $R_1$, $R_2$ and m have the meanings said for formula (Ia).

More preferably the photochromic diarylethene polymer according to the present invention is

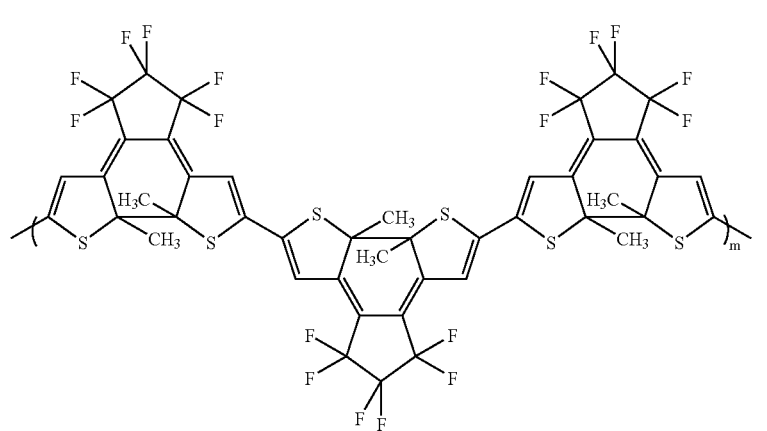

(II)

Preferably the photochromic diarylethene polymer (I) is dispersed in said matrix.

DETAILED DESCRIPTION OF THE INVENTION

Suitable matrix materials can be selected among those transparent to the wavelength values used in the telecommunication systems (1550 nm) and soluble in the same solvent dissolving the photochromic polymer (Ia).

Examples of matrix useful for the present invention include polystyrene, polymethylmethacrylate (PMMA), polycarbonate, polysulphone, polyimide, fluorinated or deuterated PMMA, and mixtures thereof.

In another aspect, the present invention relates to a method for the preparation of an optical waveguide comprising the steps of
  a) dissolving a photochromic diarylethene polymer of formula (Ib) as from above in an organic solvent;
  b) mixing the thus obtained solution and a polymeric matrix until a dispersion is obtained;
  c) preparing a film by depositing said dispersion on a substrate;
  d) irradiating said film, so as to form an optical path comprising a photochromic diarylethene polymer of formula (Ia) as from above.

Preferred organic solvents for the dissolution of the polymer (Ib) (step a) are chlorinated solvents, e.g. tetrachloroethane.

Preferably the photochromic diarylethene polymer of the invention is dissolved in said matrix at a concentration not higher than 20% by weight. Preferably said concentration ranges between about 0.1% and about 15% by weight. Still more preferably, the concentration ranges between about 5 and about 10% by weight.

As already mentioned above, the polymers of the invention can exist as two stable isomers (open Ib and closed Ia forms). Said polymers can undergo photochromic reactions as shown by the following scheme for a preferred polymer (II):

The refractive index difference, or change, Δn existing between the

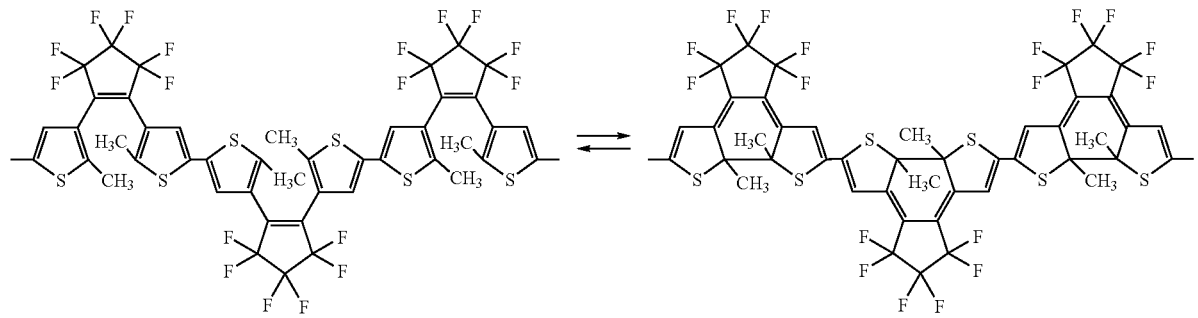

two above forms makes the polymers of the invention suitable to be used as waveguides useful for telecommunication devices, by simply using light for writing the desired optical path (direct writing technique). The refractive index difference Δn between the closed and the open form of the polymers of the invention (dispersed in polystyrene matrix) is higher than $10^{-3}$ and enables a monomodal propagation at 1550 nm on optical sections of some, $\mu m^2$, suitable for the realization of telecommunication devices and for the connection to optical fibers.

According to the invention, said diarylethene polymers (Ib) are dissolved in a suitable solvent, such as for example tetrachloroethane, and dispersed homogeneously in a suitable polymeric matrix, such as for example polystyrene (host-type polymer). Films of the thus obtained material, that is, the diarylethene polymer dispersed in the polymeric matrix, are then formed on a suitable substrate, such as BK7 glass, then irradiated to perform said cyclization photochromic reaction, yielding a refractive index channel.

This irradiation step is preferably carried out by a so-called "direct writing" method by employing, e.g., an UV laser beam, without the use of masks or other more complex techniques.

The present invention is now further illustrated with reference to the following examples.

EXAMPLE 1

Preparation of 3,5-dibromo 2-methylthiophene (1)

A solution of bromine (29 ml, 561 mmol) in acetic acid (120 ml) was added to a solution of 2-methylthiophene (25 g, 0.255 mol) in the same solvent, stirred and cooled in an ice bath. The reaction mixture was kept at 0–5° C. for an hour, then 16 hours at room temperature, and then it was treated with water. The dark oil deposited at the bottom of the flask was collected and the aqueous phase extracted with diethyl ether. The organic-phases were then washed with $H_2O/NaHCO_3$ and dried on $Na_2SO_4$. The solvent was evaporated and the resulting dark oil distilled under vacuum (1.3×10$^{-1}$ mbar). Three fractions of colourless liquid (50° C., 58° C., 75° C.) were separated and analyzed by gas chromatography. The total yield of compound (1) was 90%; the fraction distilled at 58% had a purity of 99% and was used for the subsequent reactions.

$^1$H-NMR (CDCl3), δ (ppm): 6.86 (s, aromatic H), 2.34 (s, $CH_3$).

EXAMPLE 2

Preparation of 4-bromo 5-methyl 2-thienylbornic acid (2)

In a 500 ml flask at −78° C. a solution of the compound obtained in example 1 (26.37 g, 103 mmol) was stirred in 150 ml of anhydrous diethyl ether. 42 ml of butyl lithium (2.5M in hexane) were slowly dropped and, after 30 minutes, 38 ml of distilled $B(OCH_3)_3$ were added. After 1 hour the temperature was raised and the reaction quenched at room temperature in 1.2N $HCl/H_2O$ in order to dissolve the lithium salts, and extracted with diethyl ether. Once the solvent was evaporated, a yellow solid was obtained, which, after washing with pentane, gave the desired compound (2) in a yield of 63%.

$^1$H-NMR (CDCl$_3$), δ (ppm): 7.43 (s, aromatic H), 4.31 (s, $B(OH)_2$), 2.44 (s, $CH_3$)

EXAMPLE 3

Preparation of 4,4'-dibromo-5,5'-dimethyl-2,2'-bisthiophene (3)

a) In a 250 ml flask 8.86 g of compound (1) (34.6 mmol) and palladium tetrakis phosphine were placed under argon atmosphere in 100 ml of degassed dimethoxy ethane. Boronic acid of example 2 (7.3 g, 33 mmol) and 1N $NaHCO_3$ (54 ml) were added in rapid sequence. The reaction mixture was refluxed for 4 hours, the resulting solution was extracted with diethyl ether and the organic phase dried on $Na_2SO_4$. After evaporation of the solvent, the product was purified by chromatography (silica, petroleum ether) to give 3.4 g of white solid (3) in a yield of 28%.

b) In a 500 ml flask a solution of compound (1) (25 g, 97.6 mmol) in 200 ml of anhydrous diethyl ether was stirred at −78° C. under inert atmosphere. Butyl lithium (1.85M in hexane; 54.6 ml) was then dropped. After 1 hour $CuCl_2$ (14.6 g, 108 mmol) was added and the mixture was allowed to react at −78° C. for 1 hour and 16 hours at room temperature. The reaction was then quenched with water and filtered. The organic phase was dried on $Na_2SO_2$ and the solvent evaporated to give a bright yellow solid, which was purified by chromatography (silica, petroleum ether). A white solid (3) was obtained in a yield of 72%.

$^1$H-NMR (CDCl$_3$), δ (ppm): 6.91 (s, $H_3$ $H_3$'), 2.4 (s, $CH_3$)

EXAMPLE 4

Preparation of poly-1,2-bis-(2-methyl-3-thienyl)-perfluorocyclopentene of Formula (I)

A solution of butyl lithium in hexane (2.5M, 3 ml) was dropwise added to a solution of the compound of example 3 (1.5 g, 4.26 mmol) in anhydrous THF (100 ml) at −78° C. To the stirred solution 1,2-perfluorocyclopentene (0.58 ml). was added after 1 hour. The reaction mixture was stirred for 18 hours at room temperature, then treated with $H_2O/HCl$ and extracted with ethyl ether. The obtained organic phase was dried on $Na_2SO_4$, the solvent evaporated and the product was collected and washed with pentane to give the 0.750 g of bright yellow solid in a yield of 47%.

$^1$H-NMR (CDCl$_3$), δ (ppm): 7.08 (s, aromatic H), 1.99 (s, $CH_3$)

EXAMPLE 5

Photochromic diarylethenic polymer of example 4 was dissolved in tetrachloroethane (Aldrich, 98%), and then commercial polystyrene (Aldrich, Mw=230,000, Tg=94° C.) was added in small portions, until a complete homogenization was obtained. In order to facilitate the dissolution of the polymeric matrix, the solution was maintained under stirring and low heating for several hours. The final concentration of polystyrene in tetrachloroethane was 9.4% by weight, and the concentration of the polymeric chromophore (I) in the matrix Was 8.8% by weight. The resulting solution was filtered on PTFE filter (pores diameter: 0.45 μm) and degassed under vacuum. All the above steps were carried out by protecting the photochromic solution from light.

Films were prepared by depositing the above solution on BK7 glass substrate by spin-coating, using a Karl Suss RC8 apparatus (Karl Suss France—France). Operating conditions were: 1500 rpm, 3000 rpm/s, 10 s. The obtained films were allowed to dry at room temperature.

Optical properties of the films were measured with a Metricon Prism Coupler 2010 (Metricon Corporation—Pennington, N.J.—USA). The refractive index of the UV irradiated film (closed form of the chromophore in polystyrene) was 1.5672, whereas in the non-irradiated film was 1.5648. The refractive index difference between the two forms of the chromophore was therefore $2.4 \cdot 10^{-3}$ at 1550 nm.

Using the data registered with Metricon, a waveguide was projected by means of a conventional Fwave software version IV (Nanoelectronics Research Center, Dept. of Electronics and Elec. Eng., University of Glasgow, Scotland, UK). On a 3 μm thick film on a BK7 glass substrate, a 3 μm wide channel (closed form of polymer I) was obtained using an UV laser beam. The pattern of the waveguide was formed by moving either the substrate or the beam source (while the other one remains stationary) in such a way that the directed beam or focused beam contacts only the desired predetermined regions of the polymer layer. These directed or focused beam techniques are known in the art as "direct writing" methods. A "direct writing" method as described above for the waveguide preparation was used focusing 3 μm UV radiation beam, produced by 248 nm excimer laser at 20 pulses/sec, 300 mJ/pulse, through quartz optical fiber on a non irradiated film of 3 μm thickness. The optical fiber was connected with custom-made "direct" writing device, controlled by optical microscope. Open form polymer and air surrounded the guide.

The invention claimed is:

1. An optical waveguide comprising a matrix and an optical path including a photochromic diarylethene polymer having the general formula (Ia)

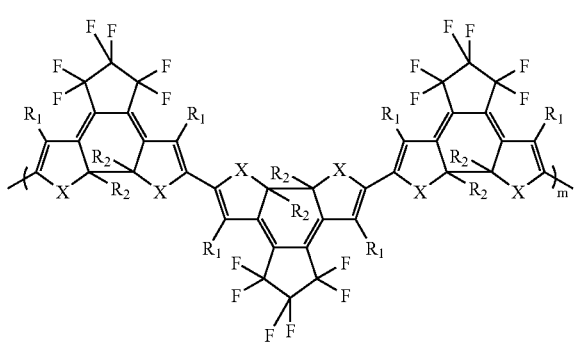

(Ia)

wherein

X is S, O, Se, Te, or N—R, wherein R is hydrogen or a linear or branched ($C_{1-12}$)alkyl group;

$R_1$ is hydrogen, a linear or branched ($C_{1-12}$)alkyl or ($C_{1-12}$)alkoxy group;

$R_2$ is a linear or branched ($C_{1-12}$)alkyl group; and m=4–100.

2. The optical waveguide according to claim 1, wherein X is S, Se or Te.

3. The optical waveguide according to claim 2, wherein X is S.

4. The optical waveguide according to claim 1, wherein $R_1$ is hydrogen or a ($C_{1-3}$)alkyl group.

5. The optical waveguide according to claim 1, wherein the optical path is surrounded by a matrix comprising a photochromic diarylethene polymer having the general formula (Ib)

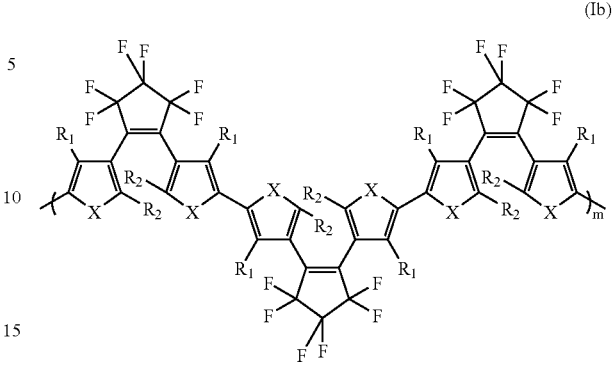

(Ib)

wherein

X is S, O, Se, Te, or N—R, wherein R is hydrogen or a linear or branched ($C_{1-12}$)alkyl group;

$R_1$ is hydrogen, a linear or branched ($C_{1-12}$)alkyl or ($C_{1-12}$)alkoxy group;

$R_2$ is a linear or branched ($C_{1-12}$)alkyl group; and m=4–100.

6. The optical waveguide according to claim 5, wherein X is S, Se or Te.

7. The optical waveguide according to claim 6, wherein X is S.

8. The optical waveguide according to claim 5, wherein $R_1$ is hydrogen or a ($C_{1-3}$)alkyl group.

9. The optical waveguide according to claim 1, wherein said photochromic diarylethene polymer is dispersed in said matrix.

10. The optical waveguide according to claim 1, wherein said matrix is selected from polystyrene, polymethylmethacrylate (PMMA), polycarbonate, polysulphone, polyimide, fluorinated or deuterated PMMA, and mixtures thereof.

11. A method for the preparation of an optical waveguide comprising the steps of:

a) dissolving in an organic solvent a photochromic diarylethene polymer having formula (1b)

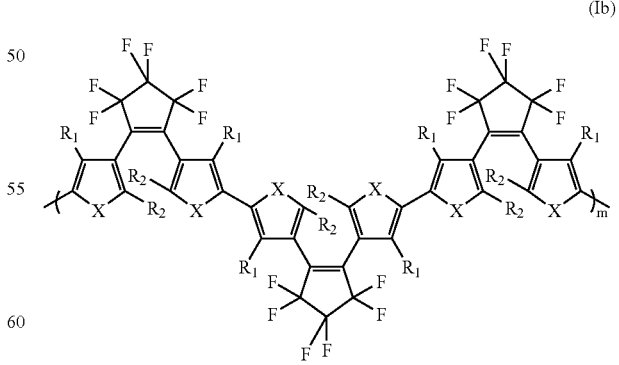

(Ib)

b) mixing the thus obtained solution and a polymeric matrix until a dispersion is obtained;

c) preparing a film by depositing said dispersion on a substrate; and d) irradiating said film so as to form an optical path comprising a photochromic diarylethene polymer having formula (Ia)

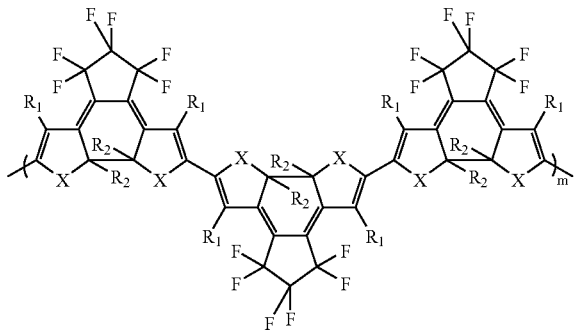

wherein in formula (1b) and (1a)

X is S, O, Se, Te, or N—R, wherein R is hydrogen or a linear or branched $(C_{1-12})$alkyl group;

$R_1$ is hydrogen, a linear or branched $(C_{1-12})$alkyl or $(C_{1-12})$alkoxy group;

$R_2$ is a linear or branched $(C_{1-12})$alkyl group; and m=4–100.

12. The method according to claim 11, wherein X is S, Se or Te.

13. The method according to claim 12, wherein X is S.

14. The method according to claim 11, wherein $R_1$ is hydrogen or a $(C_{1-3})$alkyl group.

15. The method according to claim 11, wherein the organic solvent is a chlorinated solvent.

16. The method according to claim 11, wherein the photochromic diarylethene polymer of the invention is dissolved in said matrix at a concentration not higher than 20% by weight.

17. The method according to claim 16, wherein said concentration is between 0.1% and 15% by weight.

18. The method according to claim 17, wherein the concentration is between about 5 and about 10% by weight.

* * * * *